H. P. TOWNSEND.
MACHINE FOR MAKING WOOD SCREWS.
APPLICATION FILED FEB. 5, 1910.

1,053,244.

Patented Feb. 18, 1913.
6 SHEETS—SHEET 1.

WITNESSES
James L. Caffrey.
M. H. Cummins.

INVENTOR
Harry P. Townsend
BY HIS ATTORNEY
Arthur B. Jenkins.

H. P. TOWNSEND.
MACHINE FOR MAKING WOOD SCREWS.
APPLICATION FILED FEB. 5, 1910.

1,053,244.

Patented Feb. 18, 1913.

H. P. TOWNSEND.
MACHINE FOR MAKING WOOD SCREWS.
APPLICATION FILED FEB. 5, 1910.

1,053,244.

Patented Feb. 18, 1913.
6 SHEETS—SHEET 5.

H. P. TOWNSEND.
MACHINE FOR MAKING WOOD SCREWS.
APPLICATION FILED FEB. 5, 1910.

1,053,244.

Patented Feb. 18, 1913.

UNITED STATES PATENT OFFICE.

HARRY P. TOWNSEND, OF WATERBURY, CONNECTICUT, ASSIGNOR TO THE E. J. MANVILLE MACHINE COMPANY, OF WATERBURY, CONNECTICUT, A CORPORATION OF CONNECTICUT.

MACHINE FOR MAKING WOOD-SCREWS.

1,053,244. Specification of Letters Patent. Patented Feb. 18, 1913.

Application filed February 5, 1910. Serial No. 542,217.

*To all whom it may concern:*

Be it known that I, HARRY P. TOWNSEND, a citizen of the United States, and a resident of Waterbury, in the county of New Haven and State of Connecticut, have invented a new and Improved Machine for Making Wood-Screws, of which the following is a specification.

My invention relates to the class of machines used for making wood screws, that is, screws adapted to be secured in wood, and objects of the invention among others are to increase the rapidity of the machine in its output over prior machines, to improve the product of the machine, and generally to provide a machine having novel features of advantage and utility.

A machine embodying a preferred form of construction and in the use of which the objects above set out may be attained is illustrated in the accompanying drawings, in which—

In the accompanying drawings the letter A denotes the frame of the machine constructed in a manner common to devices of this class usually from cast metal, with a bottom B arranged to rest upon and be secured to any suitable bed or base, commonly a support rising from a pan adapted to catch the chips, work, oil, etc. This frame includes uprights extending from the base and located in suitable position to receive bearings for the cam shaft, spindle and other movable parts, and also acting as a support for other portions of the machine, these uprights being preferably integrally formed with the base.

*Feed mechanism.*—To secure the best results in the feed it is important that its members, including the hopper, hopper blade, and its operating mechanism, the track and the carrier with its operating mechanism, shall all be rigidly supported and maintained in their relative positions, so that there shall be no binding or cramping of the members connected to operate the mechanism or of the blanks in their movement from the hopper to the carrier and from the latter.

It frequently becomes necessary to adjust the carrier with respect to the feeding fingers. With the parts all rigidly secured to a single bracket this adjustment is effected by a movement of the bracket only, so that a separate adjustment of different parts of the feeding device is not required as would be the case were they separately mounted.

In prior machines, when it becomes necessary to change the machine to operate upon blanks of different sizes the space between the sides of the track and other parts of the feed mechanism must be adjusted to accommodate the different sizes of blanks. This requires a stopping of the machine and considerable time to take down parts of the feed mechanism and replace them with other parts of proper size. By mounting all of these parts on a single bracket which is removably secured to the machine entire feed devices for different sizes of blanks may be assembled ready for use, and when it is desired to change to arrange the machine for operation on a different size of blank all that is required is to remove the bracket with its feed mechanism attached thereto and substitute a new one. The operation of the machine will thus be interrupted for only a brief period, and this is an important feature, as it is the aim of the builders of machines of this class at the present time to so construct them that they may be practically continuously in operation during the periods regularly intended for their use.

A device embodying in its construction features to enable the results above mentioned to be obtained is illustrated herein, the numeral 25 indicating a lug projecting from the side of one of the end uprights C to which one of the legs 26 of the hopper bracket 27 is removably secured, as by means of bolts, the other leg of the bracket being secured to an upright D extending lengthwise of the bottom B and about centrally thereof, being joined to the end upright E. In the preferred form of attachment slots 28 are formed in the legs of the bracket through which bolts project into the supports for the legs, and by this means the bracket may be adjusted longitudinally of the frame, and especially to bring the carrier into position to properly deliver the blanks.

Figures 5, 17:
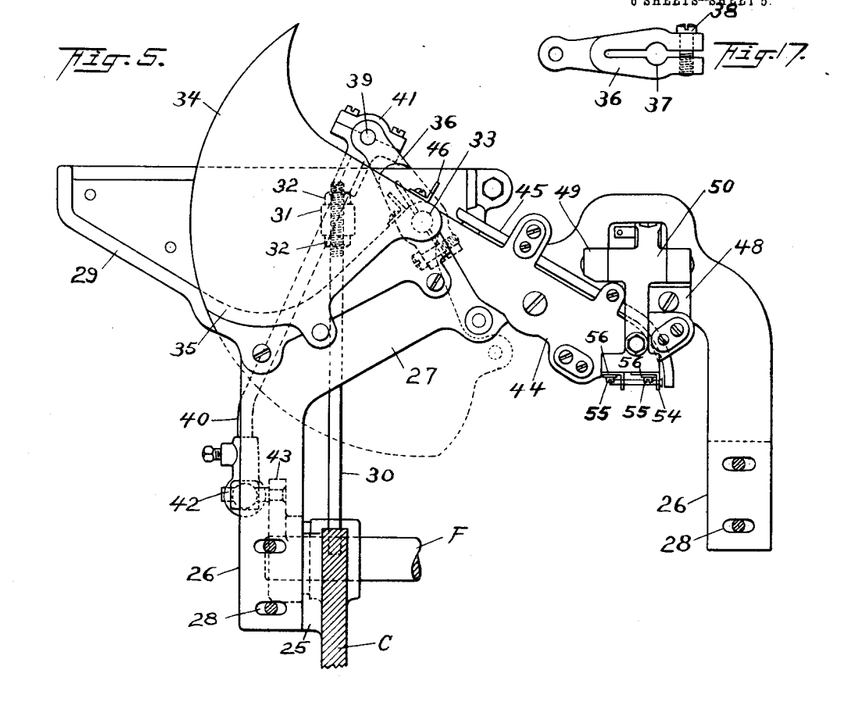
Fig. 5 is a detail view in front elevation of the hopper bracket and parts supported thereon.
Fig. 17 (Sheet 5) is a detail side view of the blade actuating arm.
Figure 9:
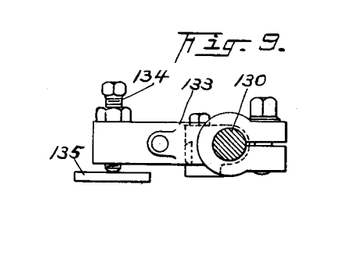
Fig. 9 (Sheet 3) is a detail view in cross-section through the pointer bar and an edge view of the contact arm thereon.
Figure 10:
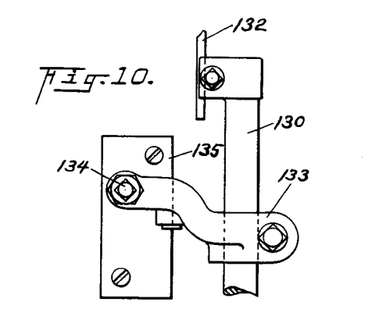
Fig. 10 (Sheet 3) is a detail top plan view of the same showing the pointing tool in place in the bar.

A hopper 29 is rigidly secured to the bracket 27 preferably at one end thereof, and as a means of firmly securing the hopper a stay rod 30 with its upper end secured near the outer edge of the hopper on the side containing the bearing for the hopper blade shaft and its opposite end to the end of the frame of the machine, as shown in Fig. 5, is employed. The rod at its upper end passes through a lug 31 on the inside of the hopper and is retained in position by adjusting nuts 32.

A hopper blade shaft 33 is mounted in bearings in the hopper extending from the edge to a point near the center, and on the inner end of this shaft a hopper blade 34 is secured. This hopper blade is pointed at its outer or free end, as shown in Fig. 5, and is curved to such point. A slot 35 is formed in the bottom of the hopper through which this blade passes in its operation, the curve in its upper edge conforming to the inside shape of the bottom of the hopper, so that when the blade is withdrawn to its lowermost position its upper edge will conform to the shape of the bottom of the hopper, thus closing the slot 35 flush with the bottom of the hopper.

Figure 3:
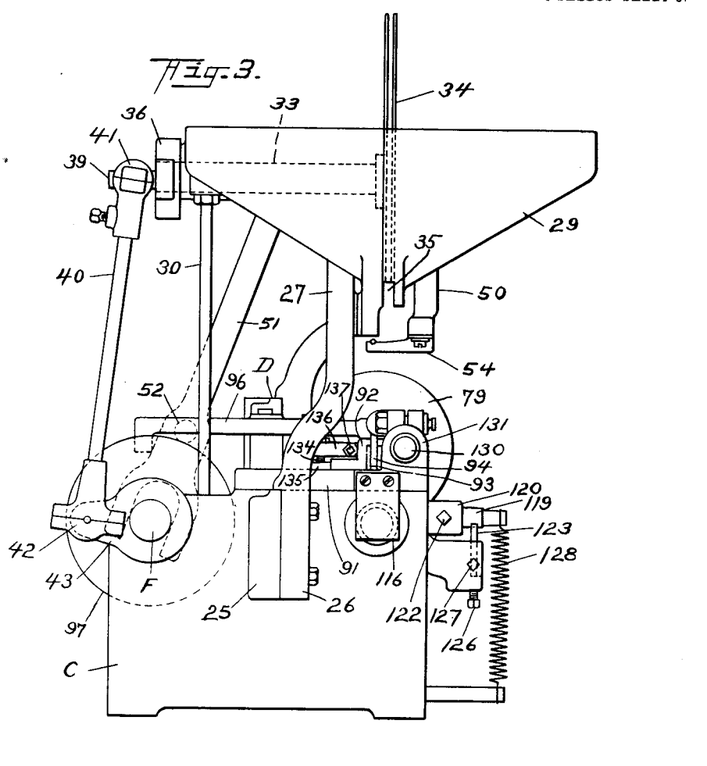
Fig. 3 is a detail end view looking from the left of the machine, as illustrated in Figs. 1 and 2.
Figures 4, 11, 12, 13:
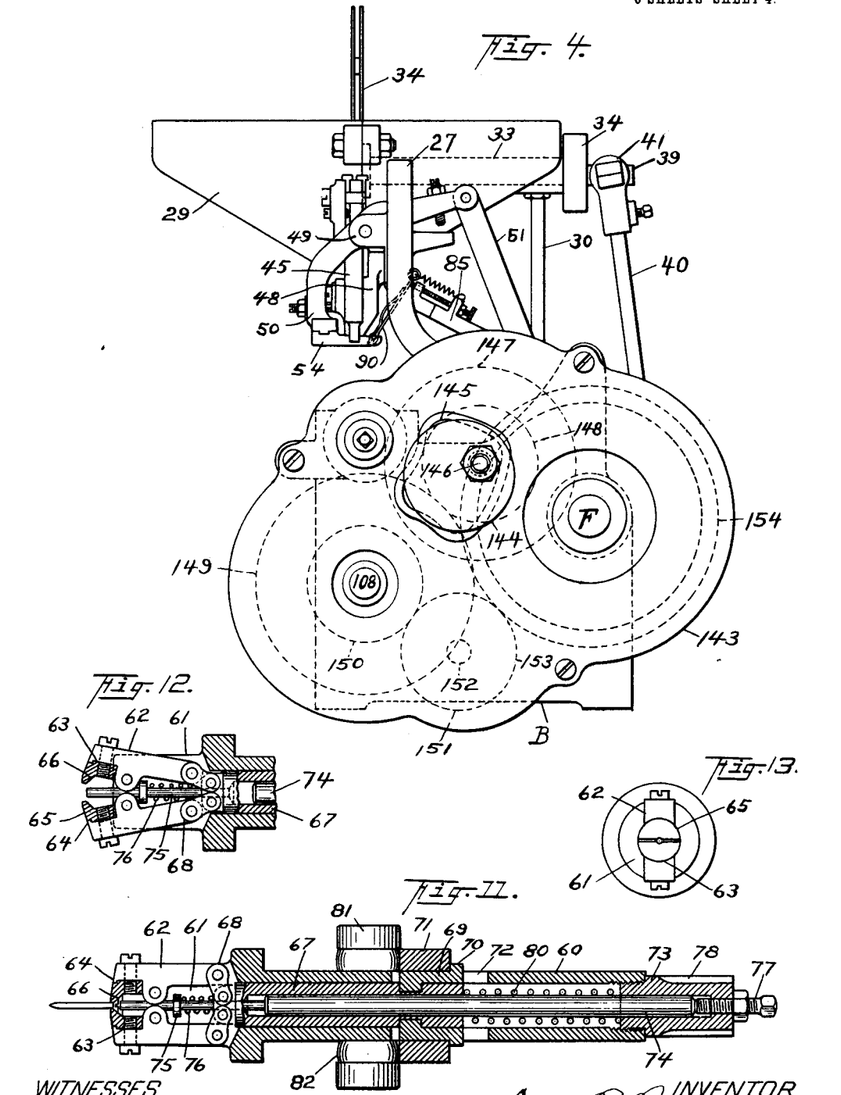
Fig. 4 is an end view of the machine looking at the opposite end from that shown in Fig. 3.
Fig. 11 (Sheet 4) is a detail view in central longitudinal section through the spindle showing the jaws closed.
Fig. 12 (Sheet 4) is a like view through one end of the spindle showing the jaws open.
Fig. 13 (Sheet 4) is a detail view of the end of the spindle.

The hopper blade is slotted in the usual manner, as shown in Fig. 3 of the drawings, so that as it passes through a mass of the headed blanks in the hopper the shanks of some of these blanks will pass to the slot, the head of the blank overlying the edges of the slot and as the blade is projected upward into an inclined position these blanks slide downward into the track to convey them to the carrier. To impart this movement to the blade a hopper blade arm 36 is secured to the end of the shaft 33 outside of the hopper. This arm is split from its end to a point reaching considerably beyond the opening 37 for the shaft 33, and a binding screw 38 is employed to frictionally secure the arm to the shaft. A stud 39 projects from the side of the arm 36 and a blade driving rod 40 is secured to this stud as by means of a ball joint 41 while the lower end is connected by means of a ball joint 42 to a crank 43 secured to the cam shaft F of the machine. The ball joints are, as plainly shown in Figs. 3, 4 and 5, formed in socketpieces to which the rod 40 is removably attached.

A track consisting of side pieces 44 is secured to the bracket 27 in any suitable manner to locate the side parts sufficiently separated to receive the shank of a blank and allow it free and easy movement along the track, the head of the blank overlying the upper edges of the track. A cover 45 may be employed if desired to prevent accidental displacement of the blanks from the track.

Figures 14, 15, 16:
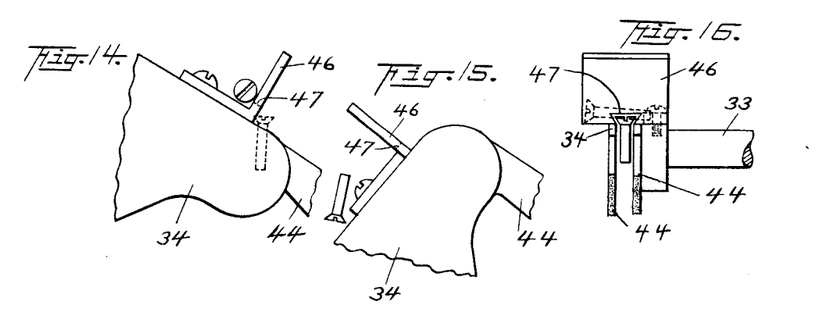
Fig. 14 (Sheet 5) is a detail view showing the connection of the feed blade to its support and illustrating the operation of the guard, the blade being in its raised position.
Fig. 15 (Sheet 5) is a like view showing the blade in its lowermost position.
Fig. 16 (Sheet 5) is a like view from a point located at a right-angle to the point of view of Fig. 14.

A guard 46 is secured to the edge of the blade 34 near its pivotal point, this guard having an opening 47 in its lower edge registering with the slot in the upper edge of the blade and of a size to permit the passage of the head of a screw, as clearly shown in Fig. 16 of the drawings. By thus locating this guard near the pivot, if any of the blanks shall lodge in improper position on the upper edge of the blade, as shown in Figs. 14 and 15, they cannot, of course, pass through the guard, and when the blade is drawn downward into the hopper in the position shown in Fig. 15 all of the blanks thus improperly placed on the upper edge of the blade will fall back into the hopper, as indicated in said figure.

All of the parts of the blade and its connection are so rigidly constructed that there is chance for little spring action such as would cause the blade when caught by a blank and suddenly released to snap and thus throw the blanks from the hopper. The frictional connection of the hopper blade arm 36 allows said arm to slip under the application of a predetermined force should the blade become wedged for any cause.

A carrier bracket 48 is secured to the face of the bracket 27 and has ears 49 in which is journaled a carrier lever 50. The journals of this lever are located immediately over the point of delivery of a blank to the feeding fingers and in close proximity thereto. This enables an extremely rigid lever to be employed, as it may be of minimum length. One end of the lever projects through an opening in the bracket 27 and is pivotally connected with a carrier operating rod 51, the lower end of which straddles the cam shaft, as shown in dotted lines in Fig. 3 of the drawings, and has a roll 52 resting in contact with the edge of the carrier cam 53 secured to the cam shaft F. The carrier proper consists of side parts constituting carrier fingers 54 adjustably secured to the end or base of the lever 50, this adjustment being obtained as by means of screws 55 passing through slots in the finger bases 56, shown in Fig. 5 of the drawings, so that the fingers may be adjusted toward or from each other to accommodate different lengths of screws.

A spindle 60 is supported at the upper edge of the upright E and an upright G, near the front of the machine. This spindle is tubular, having at its front end jaw supports 61 spaced apart a distance equal to the thickness of the jaws 62, which are pivotally mounted between the supports near the outer end thereof. The jaws each have a recess 63 formed lengthwise thereof and on the arc of a circle in cross section, a lip 64 being located at the ends of the jaws. Grips 65 are formed to fit the recesses 63, these grips being secured in place in the recesses by means of screws and having beveled gripping surfaces 66.

A jaw closer 67 is located within the spindle, its front end connected by toggles 68 with the rear end of the jaws 62, so that the front ends of the jaws will be opened and closed by a lengthwise movement of the jaw closer. This jaw closer is also tubular and has near its rear end on diametrically opposite sides two recesses for the reception of projections from stops 69. These stops each have at their outer ends stop toes 70 forming stops for a collar 71 fitted about the spindle and holding the stops 69 in place. These stops are located in slots 72 formed on diametrically opposite sides of the spindle 60. A tip 73 is secured in that end of the spindle 60 opposite the jaw or chuck, this tip being bored from one end forming a chamber in which the end of a stop rod 74 is located. This stop rod projects along within the spindle and into the opening in the jaw closer 67. An ejector 75 extends into the closed end of the jaw closer and rests with its inner end against the stop rod 74, the outer end of the ejector lying in position to receive the end of a blank and limit its movement as it is pushed in between the jaws. A spring 76 thrusting against a shoulder on the ejector forces it toward the end of the spindle. An adjusting screw 77 passes through the closed end of the tip 73 in position to engage the end of the stop rod 74, and by means of this adjusting screw the location of the ejector 75 is determined to accurately position the screw blank when it is placed in the chuck. The thrust of the spring 76 against the ejector will cause a screw blank to be thrust from between the jaws when they are opened. The tip 73 is formed into a pinion 78 and a pulley 79 is secured to the spindle, by means of which it is rotated as from a belt. This construction of the beveled jaws causes them to engage the under beveled side of the head of a blank and thus force it tightly against the ejector 75. As the grips become worn and the screws thus insecurely held, by means of the adjusting screw 77 the ejector 75 may be located in a position slightly advanced, thus causing the beveled surfaces of the heads of the blanks and of the grips to tightly engage and provision for considerable wear of the grips is thus made. The jaws being closed by the spring 80, slight variations in the size of the heads of the blanks in diameter would not interfere with the gripping power, as they may be set to grip those of smaller size and the spring will accommodate them to the grip of those of larger size.

A chuck operating lever 81 is pivoted on the upper edge of the upright D, the fork of the lever straddling the spindle and bearing rolls 82 to thrust against the opening collar 71, and the opposite end of the lever bearing a removable shoe 83 co-acting with the chucking cam 84 on the cam shaft F.

A feeding finger lever 85 is pivotally mounted on the hub 86 of an actuating arm rotatably mounted on a pin 87 secured in a bracket 88 attached to the back of the upright D. The arm from the hub 86 projects downward and is operated upon by the feeding finger cam 89 to cause the feeding lever 85 to be timely rocked to engage the feeding fingers 90 with a blank on the carrier fingers 54.

The cam 89, the lever 85 and the fingers 90 are so constructed and arranged that as the lever is rocked by the cam the feeding fingers remove the blank from the carrier fingers and place it in position with its ends in the axis of the spindle and with the headed end opposite the opening in the chuck and in proximity thereto. The construction and operation of these feeding fingers and their operating parts are of old and well-known construction and as it forms, except in connection with other elements, no part of the present invention, a further and detailed description will not be made herein.

A plate 91 is secured to the top edge of the upright C and the intermediate upright H of the frame. Two slide brackets 92, oppositely arranged and having lips at their upper edges (see Fig. 3) are supported on this plate, and shoes 93 are located to slide on the plate between it and said lips. A rocker 94 having a pusher 95 is mounted on a pin, the opposite ends of which are secured in the shoes 93. The end of the pusher is bent downward (see Fig. 1) in position to engage the end of a blank and force it between the grips of the chuck jaws, the feeding fingers being withdrawn from the blank when the latter is located between the grips.

A pusher lever 96 is pivotally mounted on the plate 91, one end of the lever being located in a recess in the upper edge of the rocker and the other end of the lever engaging with a pusher cam 97 secured to the cam shaft F. A rest 970 receives the pusher at the lower limit of its rocking movement. The construction and operation of this pusher mechanism is one well-known and will be readily understood by those skilled in the art and a further detailed description is therefore omitted herein.

Figure 20:
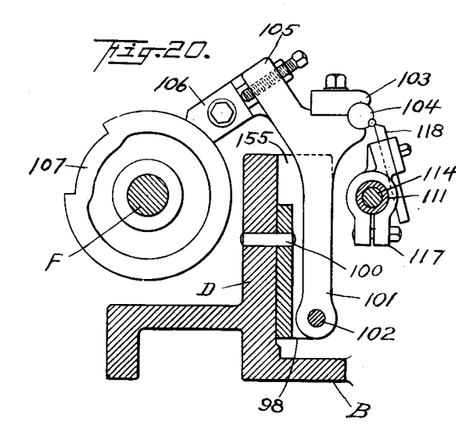
Fig. 20 (Sheet 6) is a detail view in section through a portion of the machine showing the back rest lever and its method of mounting.
Figure 21:
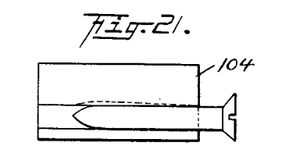
Figs. 21 and 22 (Sheet 6) are detail views illustrating the manner of use and the adjustment of the back rest as it becomes worn in use.
Figure 22:
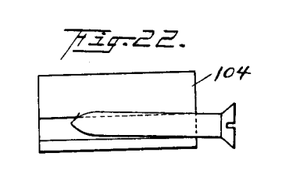

A back rest bracket 98 is secured to the longitudinal upright D, as by means of screws passing through openings 99 in the back rest and larger in diameter than the screws, so that the bracket may be adjusted in different directions. The bracket is mounted for an adjustable turning movement on a pin 100 secured in the upright, and by loosening the fastening screws the bracket may be tipped for adjustment in different directions. A back rest arm 101 is mounted on a taper pin 102 secured in the side parts of the back rest, the arm having at its upper end a clamp plate 103 for a back rest 104, which has a recess to receive the screw blank, as shown in Fig. 20 of the drawings. As shown in said figure, the thrust of the pointing tool is upward and when the back rest becomes worn, as illustrated by dotted lines in Fig. 21, by tipping the bracket on the pin 100 as a pivotal point, the back rest may be brought into the position shown in Fig. 22 and the screw blank may thus be always maintained in a horizontal position, thus insuring accurate work although the back rest becomes worn in use. It will be noted that the arm 101 closely fits between the side parts 155 of the bracket, which side parts project well toward the upper end of the arm, thus preventing chips, dirt and like material from getting behind the arm and obstructing its movement.

A backward extending projection 105 from the upper part of the back rest bears a shoe 106 in engagement with a back rest cam 107 on the cam shaft F, which cam allows the back rest to be moved away from the blank at the times when it is being pushed into the chuck and being ejected therefrom.

The threading mechanism forms an important feature of my invention and it is so constructed that the final and accurate adjustments of the threading tool are obtained by adjustment of a former shoe which is very accessibly located at the front of the machine so that the threading tool may be easily maintained in true position. Parts of the mechanism are moved in one direction by the action of cams and in the opposite direction by springs, and in order to cause no undue strain or jar on any of the parts a single spring is employed to return each of said parts. In prior constructions a single spring has been employed to force the threading tool bar toward its chasing cam, to hold its contact member against its forming shoe and to hold its actuating lever against its cam, this spring being diagonally arranged to exert a pull downward and longitudinally of the bar. The force of the downward pull to accomplish its purpose caused an excessive pull lengthwise of the bar, with a consequent injury to parts thus operated upon. By making the threading tool bar hollow its weight is greatly reduced, thereby effectually reducing shock and consequent injury therefrom. At the same time this hollow bar is utilized as an inclosure for one of the springs. The construction of this threading mechanism is also such that any error caused by inaccuracy in different working faces of the actuating cam or wear in the bearings are so reduced and minimized at the tool point as to be practically nil, the actuating lever being comparatively long as compared with the length of the tool post and the latter thus being stiff and rigid with practically no spring action. Such construction enables the tool to be set to take the full depth of cut determined by any working face of the cam against which the lever may rest when the tool is being adjusted and this without danger of another working face causing such depth of cut as to hold the blank and cause the chuck jaws to slip. This enables the full cutting capacity of the machine to be always obtained and at a minimum number of operations of the cutting tool.

Figures 1, 6:
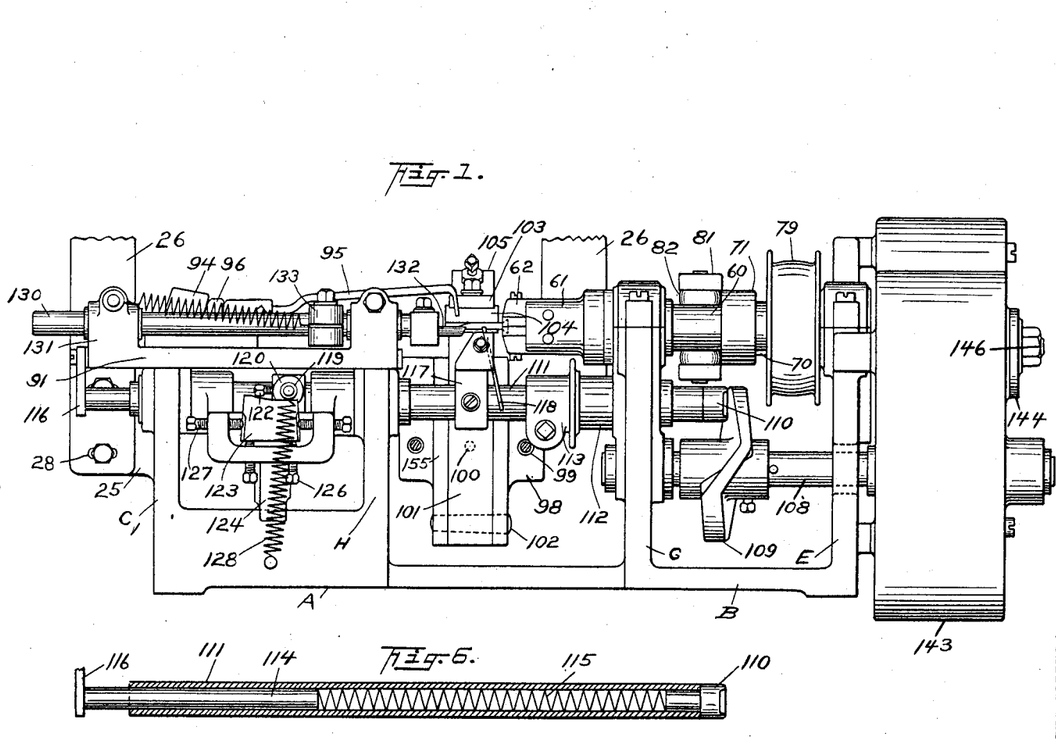
Figure 1 is a view in front elevation of the machine with the hopper bracket broken off and parts toward the rear of the machine being omitted for sake of clearness.
Fig. 6 (Sheet 1) is a detail view in lengthwise central section through the threading tool bar.

A chasing cam shaft 108 is mounted in the uprights E and G and below the spindle 60, the end of this shaft extending outside beyond the upright E. A chasing cam 109 is secured to this shaft and is arranged to engage the tip 110 of a threading tool bar 111, mounted in bearings in the uprights C, H and G. This bar projects beyond the upright G just sufficiently to permit its longitudinal movement without moving the tip into the bearing, and this allows the chasing cam 109 to be located so close to the bearing that there is no cramping action on the bar laterally of its axis. A bushing 112 is mounted in the upright G to receive the blows of a collar 113 rigidly clamped to the bar 111. The bar 111 is hollow as shown in Fig. 6 and contains at one end a plunger 114 seated against a spring 115, the opposite end of the spring thrusting against the bar, as shown herein, the thrust being received by the tip 110. This causes the bar to be forced normally toward the cam 109. The shock of the blow delivered by this spring, however, is not sustained by the cam but by the bushing 112, the movement of the bar toward the cam being stopped by the collar 113 against this bushing. This prevents the shock of the movement of the bar from being delivered upon the cam with the consequent injury thereto. A stop plate 116 secured to the edge of the plate 91 serves to limit the movement of the threading tool bar away from the chasing cam.

Figures 18, 19:
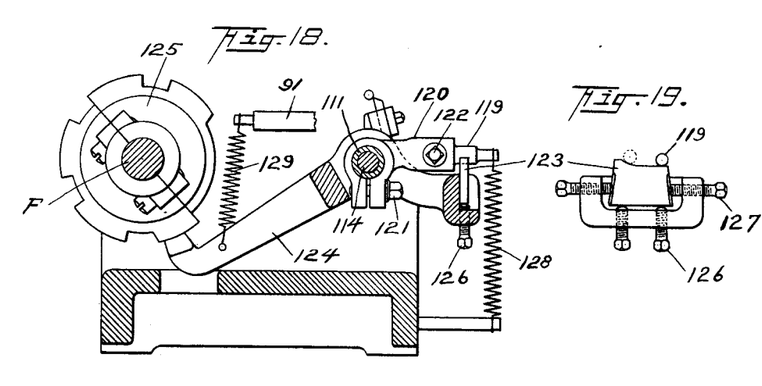
Fig. 18 (Sheet 6) is a detail view in section through the former support and illustrating the construction and operation of the former and threading tool bar.
Fig. 19 (Sheet 6) is a detail view illustrating the former.

A tool post 117 is secured to the bar 111 as by means of a set screw, this post being of a width and thickness as compared with the length of the post to avoid any spring action, the post in fact being very short, as shown in Fig. 1 of the drawings. A threading tool 118 is secured to the tool post in any suitable manner. A follow pin 119 is adjustably secured in a follow pin support 120, adjustably clamped to the threading tool bar 111, as clearly shown in Fig. 18 of the drawings, the clamp screw 121 permitting rotary adjustment of the support upon the threading tool bar and the clamp screw 122 permitting rotary adjustment of the pin 119 with respect to a forming shoe 123.

A former lever 124 is pivotally mounted on the threading tool bar 111, one end of the lever being formed to engage with a former cam 125 secured to the cam shaft F. The opposite end of the lever is provided as a support for the forming shoe 123 which shoe is mounted upon adjusting screw rests 126 in the bottom of the support and screws 127 locating the plate in a direction lengthwise of the threading tool bar. The upper edge of the forming shoe is formed to correspond with the curve of the point to be given to the screw made in the machine, but this curve of the shoe being of considerably larger radius, and the follow pin 119 being proportionately increased so that the proper movement will be given to form the point on the screw. This forming shoe is located at the front of the machine in a position where it is readily accessible and in adjusting the threading tool the latter is approximately positioned by means of adjustment of the tool post on the threading tool bar. The fine adjustment of said tool is then obtained by adjusting the forming shoe to impart to the threading tool the correct movement laterally of the axis of the screw. In case it shall be found that the threading tool is not properly positioned lengthwise of the bar to cause the threading tool to move inward at the proper time, a fine adjustment to obtain this result may be had by adjusting the shoe lengthwise by means of the screws 127.

The pin 119 may be turned in its bearing whenever it becomes worn and any wear in the shoe and pin may be readily compensated for by means of the screws 126 and 127. A spring 128 holds the pin 119 in contact with the shoe 123 and a spring 129 having one end secured to the lever 124 and its other end to a fixed part of the machine, holds the lever against the former cam 125.

It will be noted that the chasing cam shaft 108 is comparatively short, having its bearing at the outer end located in a gear casing to be hereinafter described, and that by simply removing this gear casing the shaft may be easily drawn out at this end of the machine.

The chasing cam is made reversible, each side constituting a working face of the cam, so that each chasing cam may be adapted for operation to impart different degrees of movement to the threading tool bar or for moving said bar at different intervals of time. This removable feature of the chasing cam shaft is of especial advantage where it is desired to frequently change the chasing cam in making screws of different sizes.

Figures 2, 7, 8:
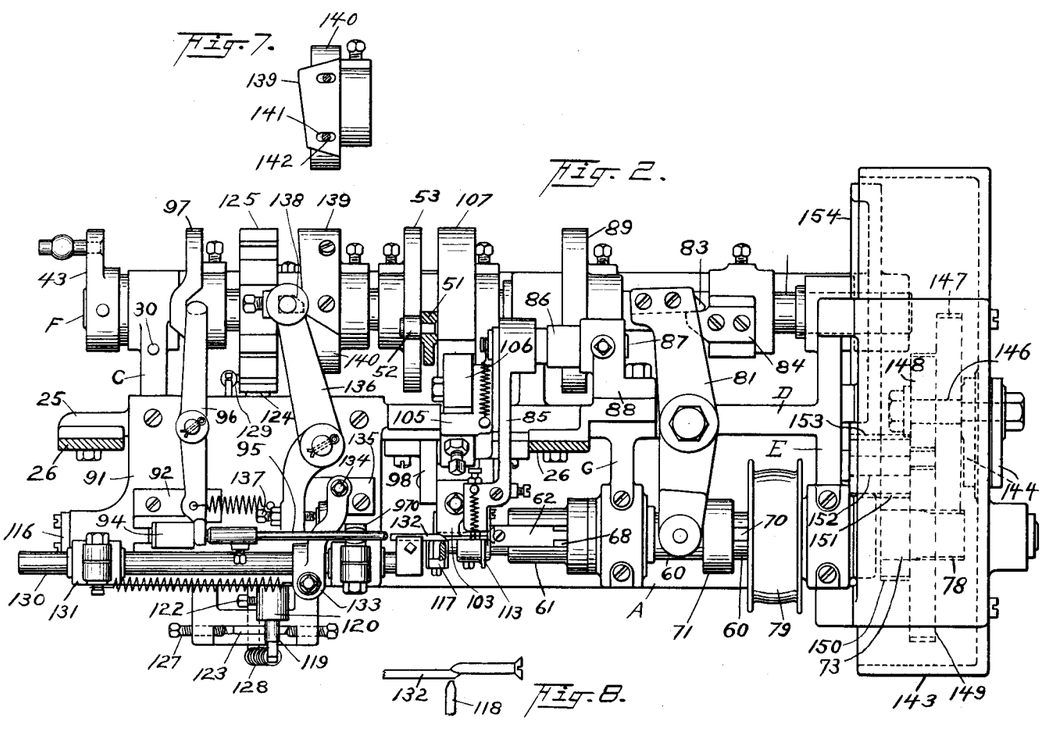
Fig. 2 is a top plan view of the machine, with the hopper bracket broken off.
Fig. 7 (Sheet 2) is a detail view showing the manner of adjusting the pointing tool cam.
Fig. 8 (Sheet 2) is a detail view illustrating the relative positions of the pointing and threading tools at certain times in the operation of the machine, and illustrating the slight movement required for the threading tool at this time.

The pointing tool is borne upon a pointing tool bar traveling parallel with the axis of the spindle, this pointing tool being comparatively thin. The threading tool is therefore required to move back but a short distance to clear the pointing tool, and the return movement of the latter can therefore take place close to the screw blank, thus saving time in the operation of the threading tool and also saving wear in the rotary movement of the threading tool bar. The relative position of the two tools is shown in Fig. 8 of the drawings. This construction allows the back-rest to be brought up against the blank while the pointing tool is doing its work, and the threading tool and pointing tool may thus be at work simultaneously. When the rotations of the blank in a single pass of the threading tool are not sufficient to enable the pointing tool to complete its work the threading tool may be caused to make one or more idle passes until the pointing operation has advanced sufficiently, when the threading tool is brought into operation, beginning its work as above described before the pointing tool has completed its work.

The pointing tool bar 130 is arranged for longitudinal reciprocation in bearings 131 rising from the plate 91, the pointing tool 132 being secured in the end of this bar. A pointing tool arm 133 is adjustably mounted on the bar, the end of the arm bearing a rest 134, as herein shown this being a screw adjustably mounted and which slides upon a pointing tool plate 135 secured to the plate 91. The pointing tool operating lever 136 is pivotally mounted upon the plate 91, one end of the lever bearing an adjusting contact screw 137 arranged to engage the arm 133 to reciprocate the pointing tool bar. The opposite end of the lever bears a toe-piece 138 adjustably mounted therein and which engages a cam 139 mounted on a cam disk 140 secured to the cam shaft F. This cam has slots 141 to receive screws 142 by means of which the cam is adjustably mounted on its disk. This adjustable mounting of the cam provides means whereby the speed of the cam shaft may be increased without increasing the rate of movement of the pointing tool.

The change speed gears connecting the several shafts are so arranged at the end of the machine that the studs upon which they are mounted will not limit the size of gears borne by other parts. In a common form of construction in use at the present time the studs for the connecting or change speed gears are mounted on the machine frame, and such location limits the size of gears that may be used upon some of the shafts, and especially upon the cam shaft. By attachment of a gear stud to the gear case the gears upon the shafts, and especially upon the cam shaft, may be of a size to project beyond the bearing stud, thus allowing the use of gears of any suitable size.

The gear case 143 is removably secured to the end of the machine as by means of screws, all the gears and pinions at the end of the machine being thus inclosed. The cam shaft F and the chasing cam shaft 108 are driven from the spindle 60 by means of intermeshing gears, the said spindle being driven, as hereinbefore explained, as by means of a belt passing around the pulley 79.

Bearing plates 144 are secured to opposite faces of the gear case, closing an opening 145 therein, these plates being securely and adjustably held by means of a nut applied to the end of a shouldered bearing stud 146. This stud bears a chasing cam change speed gear 147 and pinion 148, the former meshing with the pinion 78 on the spindle, and the latter with a chasing cam shaft gear 149 secured to the chasing cam shaft 108, this forming the driving connection for the chasing cam shaft. The end of this shaft is mounted in the gear case and extends through an enlarged opening in the frame. The driving pinion 150 for the cam shaft is secured to the chasing cam shaft, this pinion meshing with the cam shaft change speed gear 151 mounted on a cam shaft change speed gear stud 152 secured to the frame of the machine. A cam shaft change speed pinion 153 is secured to the change speed gear 151 and meshes with a cam shaft gear 154 secured to the cam shaft F through which pinion the cam shaft is driven.

It will be noted that the gear 154 projects beyond the end of the stud 146, thus allowing a larger gear to be used on the cam shaft than could be used if the stud 146 were secured to the frame of the machine, and at the same time locate the cam shaft gear close to the bearing of the cam shaft, thus avoiding any spring action in the cam shaft.

I claim—

1. A spindle, means carried by the spindle to hold an article, means for operating the spindle, a tubular tool carrying bar to operate on an article carried by the spindle, means for moving the bar in one direction, a striking tip inserted in one end of the bar, a plunger located in the opposite end of the bar, a spring located between and thrusting against said tip and plunger, and means for receiving the thrust of the plunger.

2. A spindle having means to hold an article to be threaded, means for operating the spindle, a threading tool bar to receive a tool for threading said article, a forming shoe having a curved surface to conform to the degree of curve of the point on said article, the curve of the shoe having a much greater radius than the point of the article being formed, and a follow-pin having a curve to conform to the curve of said shoe.

3. A spindle having means to hold an article to be threaded, means for operating the spindle, a threading tool bar to receive a tool for threading said article, a forming shoe having a curved surface to conform to the degree of curve of the point on said article, the curve of the shoe having a much greater radius than the point of the article to be formed, and a follow pin to engage said shoe.

4. A spindle having means to hold an article to be threaded, means for operating the spindle, a shoe having a curved surface to conform to the curve of the point on said article, a follow-pin carried by the bar and round in cross-section to conform to the curve of said shoe, and means for adjusting the follow-pin in a rotary direction.

5. In a tooling machine, a spindle having means to hold an article, means for operating the spindle, a pointing tool bar mounted for rotary movement and longitudinal movement in a direction the same as the axis of the spindle, a pointing tool arm secured to said bar, a rest to support said pointing tool arm, a pointing tool lever pivotally mounted, a contact secured in one end of said lever to engage the pointing tool arm, and a cam engaging the opposite end of said lever to move the pointing tool bar longitudinally.

6. A frame, a spindle mounted in the frame and having means to hold an article, means for operating the spindle, a tool holding bar mounted in the frame in coöperative relation with said spindle, a chasing cam shaft bearing a reversible cam to operate said tool holding bar, means for driving the cam shaft, and a gear case secured to the end of the machine and having an opening for a bearing for the end of said cam shaft and to permit its removal.

7. A frame, a spindle mounted in the frame and having means to hold an article, means for operating the spindle, a tool holding bar mounted in the frame in coöperative relation with said spindle, a chasing cam shaft bearing a cam to operate said tool holding bar, gears located at the end of the machine for connecting said spindle and shaft, and a gear case secured to the end of the machine to cover said gears and having a bearing for the end of said cam shaft which projects through an opening in the end of the frame.

8. A frame, a spindle mounted in the frame and having means to hold an article, means for operating the spindle, a tool carrying bar mounted in the frame in coöperative relation with said spindle, a cam shaft mounted in the frame bearing a cam to operate said tool holding bar, a chasing cam shaft having one end mounted in the frame and its opposite end extending through an opening therein, a train of gears located at the end of the frame for connecting said shafts, said train including a change speed gear mounted upon a stud, and a gear casing secured to the end of the frame and inclosing said gears, said casing containing a bearing for the chasing cam shaft and also supporting said change gear stud.

9. A frame, a spindle mounted in the frame and having means to hold an article, means for operating the spindle, a tool to operate upon said articles, a cam shaft connected with said tool to operate it, a chasing cam shaft to operate said tool, a train of gears located at the end of the machine to connect said shafts and spindle, said train including a change speed gear, a stud bearing said gear, and a gear casing secured to the end of the frame and inclosing said gears, said change gear stud being secured to the casing and providing an opening between the end of the stud and the frame of the machine.

10. A spindle having means to receive a screw, means for operating the spindle, a tool to cut said screw, means for operating the tool, a back-rest adapted to support the screw during the cutting operation, and means for adjustably tilting the back-rest to move its point of support for the point of the screw toward and away from the latter.

HARRY P. TOWNSEND.

Witnesses:
JAMES J. CAFFREY,
N. W. CUMMINS.

Copies of this patent may be obtained for five cents each, by addressing the "Commissioner of Patents, Washington, D. C."